United States Patent Office 3,180,088
Patented Apr. 27, 1965

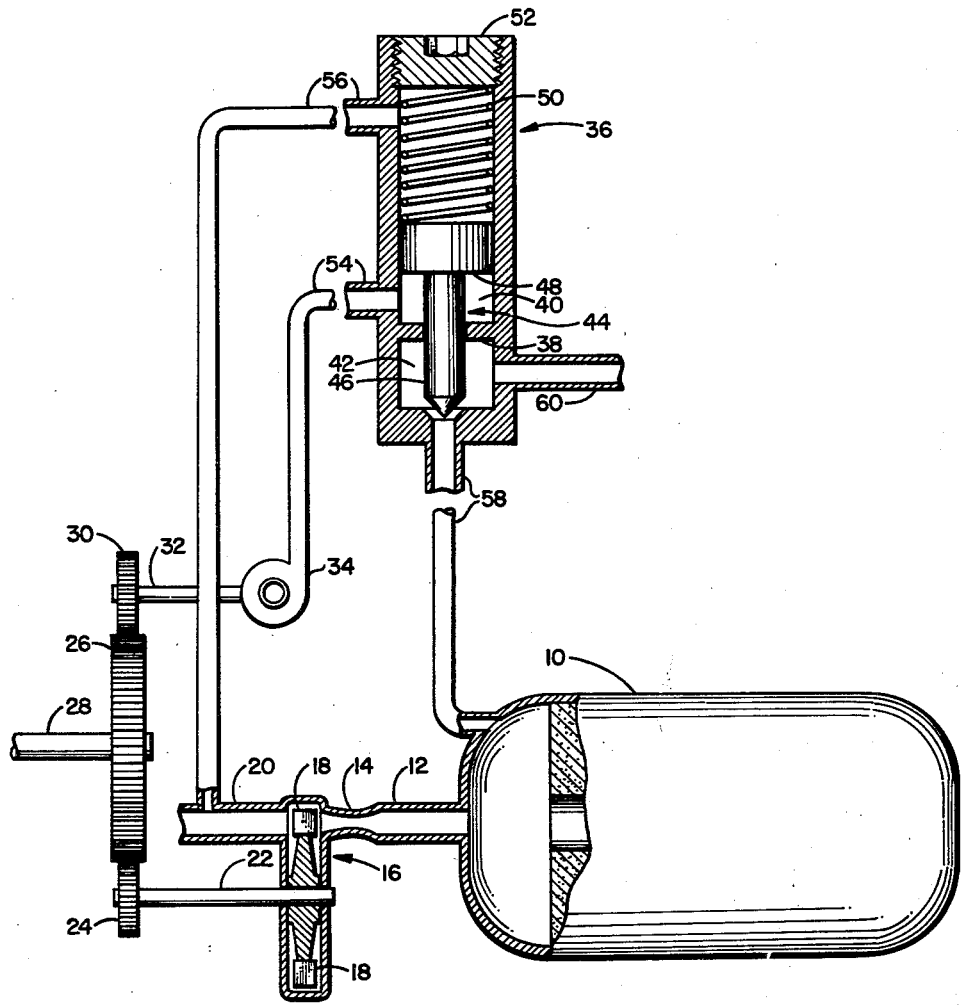

3,180,088
SPEED CONTROL SYSTEM FOR TURBINE
Robert K. Swain, Monrovia, Calif., assignor to Aerojet-General Corporation, Azusa, Calif., a corporation of Ohio
Filed Nov. 13, 1962, Ser. No. 237,104
3 Claims. (Cl. 60—39.25)

This invention relates to a speed control system for a pressure fluid responsive prime mover and more particularly to apparatus for controlling the speed of a turbine shaft so as to control the speed of an output shaft drivingly associated with the turbine shaft.

For purposes of describing the principles of this invention, the prime mover illustrated is a conventional turbine provided with a wheel having a plurality of circumferential buckets or blades, the wheel being fixedly mounted on a turbine shaft. The intake side of the buckets or blades is in communication with a suitable pressure fluid generator. The energy derived from the pressure fluid flowing past the turbine buckets or blades is realized as a torque applied to the turbine shaft. Such shaft is suitably driving connected to a power take-off means in the form of a power transmission having a primary and a secondary output with the secondary output being coupled to drive a suitable pump or compressor.

A control device is provided, having inputs, certain of which are derived from the discharge of the pump, downstream of the turbine, and from the source of pressure fluid. A selectively adjustable manually controllable input is also provided. The pump, the turbine, and the selectively adjustable inputs are combined to position a metering device which is operable to reject to the atmosphere, for example, a controlled amount of pressure fluid from such source.

Prior practices of controlling the speed of a pressure fluid responsive prime mover have included providing the prime mover with nozzles which are operable to vary the area of the flow path to the prime mover and thus vary the amount of pressure fluid delivered thereto. It is to be appreciated that such a solution to the problem of speed control involves complex mechanisms which are relatively unreliable and very expensive to manufacture and maintain.

Accordingly an object of this invention is to provide a new and improved speed control system for a pressure fluid responsive prime mover.

Another object of this invention is to provide a new and improved speed control system for a pressure fluid responsive prime mover having control means responsive to the speed and the discharge pressure of such prime mover.

A further object of this invention is to provide a new and improved speed control system for a turbine shaft, wherein the turbine is operably associated with control means, the control means being responsive to the speed of rotation of the turbine shaft and the discharge pressure from the turbine for varying the flow rate of pressure fluid from a suitable source to the intake side of the buckets or blades of the turbine.

These and other objects of this invention will become more apparent upon consideration of the following detailed description and a preferred embodiment taken in conjunction with the following drawing in which the sole figure is a diagrammatic representation of a speed control system constructed in accordance with the principles of this invention.

Referring now to the drawing, there is shown a speed control system illustrating a preferred correlation of apparatus which incorporates the principles of this invention, in which a gas generator 10, of any suitable type, is provided. As shown, the gas generator 10 comprises a rocket combustion chamber having a solid propellant grain therein as a propellant fuel source. When the propellant fuel in the rocket combustion chamber undergoes combustion, exhaust gases are given off, so that the rocket combustion chamber serves as a gas generator. A conduit 12 is connected to the gas generator 10 and serves as a discharge outlet for permitting flow of pressure fluid externally of the gas generator 10. The conduit 12 has the discharge thereof communicating with nozzle 14 which conditions the pressure fluid to flow in a preselected direction. A conventional turbine 16 is provided, the turbine 16 comprising a wheel having secured to the periphery thereof radially extending circumferentially adjacent buckets or blades 18 whose intake side is located in the path of flow of the fluid discharged by the nozzle 14. Such an association of the nozzle 14 and the buckets 18 imparts a torque to the turbine wheel 16, the mechanism of which is well-known. The pressure or motive fluid utilized to impart the torque to the turbine wheel 16 is discharged by the buckets 18 from their output side into a conduit 20 and from this point to a sink or any other suitable device designed to further extract energy from the fluid. It is to be appreciated that the illustrated conduits 12 and 20, and the nozzle 14 in actual practice take the configuration of annular flow paths for permitting flow of the motive fluid, to and from, all of the buckets 18, simultaneously.

The turbine wheel 16 has suitably secured centrally thereof an elongated turbine shaft 22 having a pinion gear 24 secured thereto. The gear 24 is operatively engaged with another gear 26 which has an output shaft 28 suitably rigidly secured thereto. Output mechanical work of this invention is realized through the rotation of the output shaft 28 which serves as a primary output shaft. Also operatively engaged with the gear 26, and driven thereby, is another gear 30 having a secondary output shaft 32 secured thereto for rotation therewith. A fluid pressurizing device of any conventional type, herein shown for purposes of illustration as a centrifugal pump or compressor 34, is secured to the secondary output shaft 32 so that rotation of the fluid pressurizing device 34 is affected by the rotation of the shaft 32. The gears 24, 26, and 30 comprise a power take-off means deriving rotation from the rotation of the turbine shaft 22.

The operation of the gas generator 10, the turbine 16 and the pump 34 are correlated by a control device in the form of a control valve assembly 36 which is adapted to receive the outputs, hereinafter particularly described, to control the output rotative speed of the turbine shaft 22 under conditions of variable load.

As shown, the control valve assembly 36 comprises an elongated tubular body or housing having a laterally extending wall 38 for forming longitudinally spaced cavities 40 and 42. A piston type valve member 44 is provided with an elongated stem portion 46 which is closely slidably received through an opening formed in the wall 38, the stem 46 extending into the cavity 42. An enlarged head portion or piston 48, formed integral with the stem 46, is slidably located in the cavity 40 and divides the cavity 40 into chambers. A spring 50 disposed in one of the chambers of gravity 40, is captively secured in the control assembly housing 36 by a retainer cap 52 which is threadably received in one end of the housing 36 so as to be selectively adjustable to apply a desired bias to the valve member 44. The bias of the spring 50 is effective to move the head portion or piston 48 of the valve member 44 toward the cavity 42. A conduit 54 provides communication between the discharge of the pump 34 and the chamber in the control assembly housing 36 defined by the wall 38 and the head portion or piston 48. The discharge pressure of the pump 34 constitutes a first input control pressure to the control assembly housing 36. Such first input of control pressure is effective to move the valve member 44 in a direction being in opposition to the bias applied by the spring 50 against the valve member 44. A second input of control pressure is derived, by means of a conduit 56, establishing communication between the conduit 20 at the output side of the turbine buckets or blades 18 and the chamber in the control assembly housing 36 defined by the retainer cap 52 and the head portion or piston 48. The second input of control pressure is effective to move the valve member 44 in the same direction as the biasing force of the spring 50.

As shown, the cavity 42 is in communication with the gas generator 10 through a suitable conduit 58. The opening in the control assembly housing 36 which is connected to the conduit 58 comprises an inlet orifice which is adapted to be partially restricted or closed by the stem 46 in order to meter or discontinue flow of fluid from the gas generator 10 to the cavity 42. The stem 46 thereby serves as an orifice-restricting means on the opposite side of the head portion or piston 48 from the spring 50 for variably regulating fluid flow from the gas generator 10 through the conduit 58 and the inlet orifice into the control assembly housing 36. The pressure in conduit 58 is effective to apply a bias on the valve member 44, through the stem 46, in opposition to the bias of the spring 50 and the control pressure derived by way of conduit 56. In addition, the control assembly housing 36 is provided with a conduit or port 60 which communicates with the cavity 42 for rejecting, to an appropriate sink, the fluid in cavity 42 derived from the gas generator 10. It is to be appreciated that the rejected fluid may be utilized to operate other devices which are responsive to a steady or intermittent flow of pressure fluid.

The operation of the preferred construction incorporating the principles of this invention is as follows, assuming that the primary output shaft 28 is being subjected to increased loading. Under these conditions, the initial response of the system would be sensibly realized by an instantaneous reduction in the speed of rotation of the gear 26 driving the primary output shaft 28. Such a reduction in the rotative speed of the gear 26 causes the input pressure of the pump 34 to decrease and in turn decrease the pressure in the chamber defined by the wall 38 and the head portion or piston 48. The valve member 44 would therefore be moved toward the inlet orifice to which conduit 58 is connected causing the stem 46 to reduce the flow rate of pressure fluid bled off from the gas generator 10 through the conduit 58. Reduction of the flow rate of pressure fluid bled off from the gas generator 10 through conduit 58 causes a consequent increase of the flow rate of pressure fluid from the gas generator 10 to the intake side of the turbine buckets or blades 18 by way of conduit 12 and nozzle 14, thus increasing the torque and output speed of the turbine wheel 16 and consequently the turbine shaft 22. During the instant of increased loading, the control pressure from the conduit 20 at the output side of the turbine buckets or blades 18 which is transmitted through the conduit 56 to the chamber defined by the head portion or piston 48 and the cap retainer 52, decreases reducing the bias on the valve member 44 which reduction tends to increase the flow of pressure fluid bled off from the gas generator 10 through the conduit 58 and subsequently exhausted through the conduit 60. The control pressure derived from the turbine discharge through the conduit 56 is of a small magnitude relative to the bias derived from the spring 50 and from the pump 34, and its main function is to balance the effect of turbine back pressure changes during engine operation. It thus has a minimal effect during load variation periods of the turbine.

During conditions of reduced loads, the turbine shaft 22 tends to overspeed, thereby increasing the control pressure from the pump 34 which moves the valve member 44 in a direction which increases the flow of pressure fluid bled off from the gas generator 10 through the conduit 58 and exhausted through the conduit 60. Such an increase in the flow of pressure fluid bled off from the gas generator 10 reduces the flow rate of pressure fluid to the intake side of the turbine 16 from the gas generator 10 through the conduit 12, and consequently a reduction of the speed of rotation of the turbine shaft 22 is effected.

The elements of this invention are preferably correlated so that no flow of pressure fluid from the gas generator 10 will occur through the conduit 58 into the inlet orifice of the control assembly housing 36 and through the exhaust conduit 60 at the maximum turbine load, the chamber of the gas generator 10 being constructed to withstand the consequent pressure developed therein.

As an alternative to the illustrated and described embodiment, it may be desired to replace the pump 34 with a source of fluid pressure which is independent of the turbine output drive and whose magnitude of pressure may be automatically or selectively changed.

Obviously many modifications and variations of the present invention are possible in the light of the above teachings. It is therefore to be understood that within the scope of the appended claims the invention may be practiced otherwise than as specifically described.

I claim:

1. A speed control system for regulating the rotation of a turbine shaft, said system comprising: a turbine including a shaft and a wheel having a plurality of circumferential blades fixed on the shaft; power take-off means operably connected to said turbined shaft for deriving rotation therefrom; gas generating means having a discharge outlet in communication with the intake side of said plurality of circumferential blades on said turbine wheel for directing gas against said blades to impart rotation to said turbine wheel, said turbine shaft, and said power take-off means; a control valve assembly comprising a housing and a piston slidably movable in said housing; said housing being provided with an inlet orifice on one side of said piston; said one side of said piston having orifice-restricting means thereon for variably regulating fluid flow through said inlet orifice into said housing; means biasing said piston in said housing in a direction toward said inlet orifice; means for bleeding off gas from said gas generating means into said housing through said inlet orifice; a pump for pumping fluid into said housing on said one side of said piston to provide fluid pressure applying a force against said piston in a direction opposed to said biasing means; said pump having a separate source of fluid independent of the gas generated by said gas generating means; means communicating with said inlet orifice in said housing for exhausting gas from said housing; and said power take-off means being operably connected to said pump for driving said pump in accordance with the speed of rotation of said turbine shaft; whereby the rate at which gas is bled off from said gas generating means into said housing through said inlet orifice is controlled by said orifice-restricting means on said one side of said piston to regulate the gas pressure from said gas generating means which is directed against the intake side of said turbine blades, thereby controlling the rotative speed of said turbine shaft.

2. A speed control system for regulating the rotation of a turbine shaft, said system comprising: a turbine including a shaft and a wheel having a plurality of circumferential blades fixed on the shaft; power take-off means operably connected to said turbine shaft for deriving rotation therefrom; gas generating means having a discharge outlet in communication with the intake side of said plurality of circumferential blades on said turbine wheel for directing gas against said blades to impart rotation to said turbine wheel, said turbine shaft, and said power take-off means; a control valve assembly comprising a housing and a piston slidably movable in said housing; said housing being provided with an inlet orifice on one side of said piston; said one side of said piston having orifice-restricting means thereon for variably regulating fluid flow through said inlet orifice into said housing;

means biasing said piston in said housing in a direction toward said inlet orifice; means for bleeding off gas from said gas generating means into said housing through said inlet orifice; means providing communication between the output side of said turbine blades and said housing on the other side of said piston; a pump for pumping fluid into said housing on said one side of said piston to provide fluid pressure applying a force against said piston in a direction opposed to said biasing means; said pump having a separate source of fluid independent of the gas generated by said gas generating means; means communicating with said inlet orifice in said housing for exhausting gas from said housing; and said power take-off means being operably connected to said pump for driving said pump in accordance wtih the speed of rotation of said turbine shaft; whereby the rate at which gas is bled off from said gas generating means into said housing through said inlet orifice is controlled by said orifice-restricting means on said one side of said piston to regulate the gas pressure from said gas generating means which is directed against the intake side of said turbine blades, thereby controlling the rotative speed of said turbine shaft.

3. A speed control system for regulating the rotation of a turbine shaft as defined in claim 2, wherein said gas generating means comprises a rocket combustion chamber having a propellant fuel therein adapted to undergo combustion.

References Cited by the Examiner

UNITED STATES PATENTS

| | | | |
|---|---|---|---|
| 1,771,720 | 7/30 | Miller | 137—36 X |
| 1,902,340 | 3/33 | Schmidt | 137—36 |
| 2,614,797 | 10/52 | Kidney | 137—16 X |
| 2,756,810 | 7/56 | Simmons | 137—36 X |
| 2,928,376 | 3/60 | Levetus | 137—36 X |

FOREIGN PATENTS

| | | |
|---|---|---|
| 454,800 | 5/13 | France. |
| 289,044 | 12/15 | Germany. |

ISADOR WEIL, *Primary Examiner.*

CLARENCE R. GORDON, *Examiner.*